Aug. 23, 1932.　　　A. C. STARR　　　1,873,065
BRAKE CONNECTION
Filed June 26, 1930
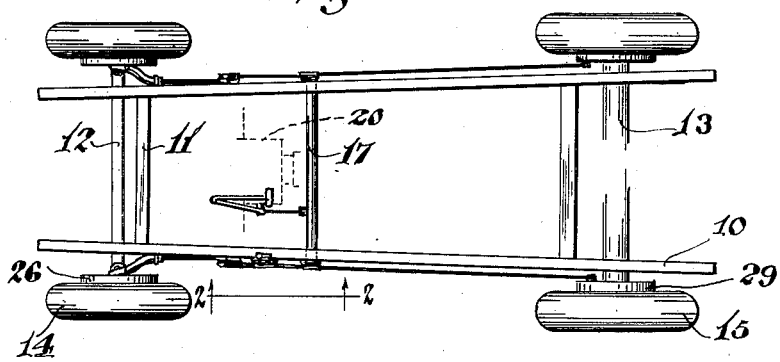
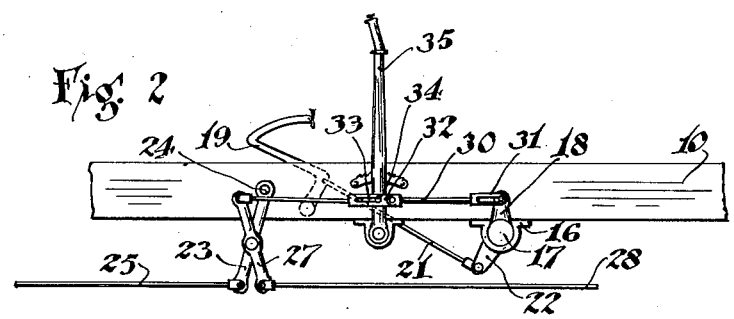
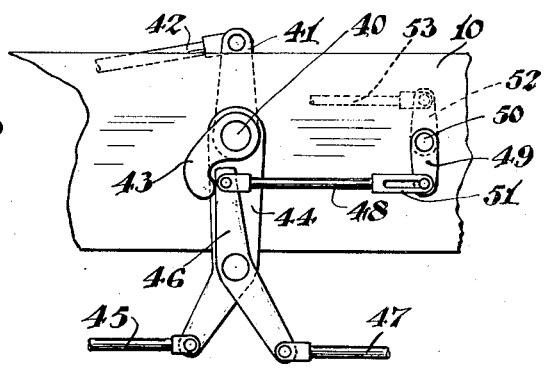
INVENTOR.
Albert C. Starr
BY
M. W. McConkey
ATTORNEY Patented Aug. 23, 1932

1,873,065

UNITED STATES PATENT OFFICE

ALBERT C. STARR, OF NEPHI, UTAH, ASSIGNOR TO BENDIX BRAKE COMPANY, OF SOUTH BEND, INDIANA, A CORPORATION OF ILLINOIS

BRAKE CONNECTION

Application filed June 26, 1930. Serial No. 463,870.

This invention relates to brakes and more particularly to hookups therefor.

Heretofore, great difficulty has been experienced in obtaining a satisfactory hookup for four wheel brakes, in that entirely effective means for applying the brakes with equal force have not been provided. It is the aim of the present invention to overcome this difficulty.

The major object of this invention is to provide means for equalizing the applying forces operating the braking elements.

A feature of the invention is a simple and inexpensive equalizer which will efficiently perform its intended functions.

Other objects and features of the invention will appear from the following description taken in connection with the drawing, which forms a part of this specification, and in which:

Figure 1 is a top plan view of a chassis illustrating the invention as applied;

Figure 2 is an enlarged detail view illustrating the equalizer; and

Figure 3 is a modified form.

Referring to the drawing for more specific details of the invention, 10 represents the side members of a motor vehicle chassis frame connected by suitable cross members 11. The frame is suitably supported by springs, not shown, on a front axle 12 and a rear axle 13 on which are mounted wheels 14 and 15.

Supported in suitable hangers 16 secured to the side members of the frame is a shaft 17 and suitably secured to the shaft is a rock arm 18. As shown, a foot pedal lever 19 is mounted on a stub shaft positioned on a transmission housing 20 and the lever 19 is connected by a rod 21 to the rock lever 22 positioned on the shaft 17. Fulcrumed on the respective side rails 10 are levers 23. These levers have one end pivoted to the frame as indicated at 24 and their other ends are pivotally connected to reach rods 25 connected to the front wheel brakes 26.

Pivotally connected to the levers 25 are rocker arms 27. These arms have one end connected as by rods 28 to the rear brakes 29 and the other ends are connected as by rods 30 to a rocker arm 18 on the shaft 17. The connection between the rods 30 and the rocker arms 18 is an overrunning connection as indicated at 31 and the rod is provided intermediate its length with a plate 32 having a slot 33 adapted to receive a pin 34 positioned on a hand brake lever 35 suitably pivoted on the frame.

Figure 3 illustrates a modification of the invention. In this modification, a cross shaft 40 is journalled in the side members 10 of the chassis frame. Positioned on the shaft is a rock arm 41 connected as by a rod 42 to a foot pedal lever, not shown, and keyed or otherwise secured to the shaft is a cam 43. Loosely sleeved on the shaft 40 by one end is a bell crank lever 44. This lever has its other end connected as by a rod 45 to the front wheel brakes, not shown.

A bell crank lever 46 is pivotally connected at its apex to the apex of the bell crank lever 44. One end of the bell crank lever 46 is connected as by a rod 47 to the rear wheel brakes, not shown. The other end of the bell crank lever 46 engages the cam 43 and is connected by a rod 48 to a rock lever 49 positioned on a shaft 50, the connection between the rod 48 and the rock arm 49 being an overrunning connection as indicated at 51. Positioned on the shaft 50 is a rock arm 52 connected by a rod 53 to a hand lever, not shown.

In operation, referring particularly to the form of invention disclosed in Fig. 2, when force is applied to the lever 19, the shaft 17 is rocked to apply force through the rock arm 18 and rod 30 to the upper end of the lever 27. This force exerted on the lever 27 rocks the levers 23 and 27 on their pivots to move the levers with equalizing effect, so that the applied force on the front and rear brakes is equalized.

By reason of the overrunning connection of the rod 30 with the hand lever 35, the brakes may be applied by the foot lever without affecting the hand lever, and because of the overrunning connection between the rod 30 and the rock arm 18, the hand lever may be operated to apply the brakes through the rod 30, the lever 28 and the rods connected therewith without in any way affecting the foot pedal lever.

The operation of the structure shown in the modification is substantially the same as the operation in the structure shown in the preferred form. In the modification, the shaft 40 is rocked when force is applied thereto through the rock arm 41 and operating means connected therewith to apply force to the lever 46 through the cam 43. The force applied to the lever 46 actuates this lever and the lever 44 with balanced action between them to apply force through the connections 45 and 47 to the front and rear brakes with equal effect.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A vehicle having front and rear pairs of brakes and a chassis frame with a pedal and an emergency lever carried thereby, in combination with a pair of levers pivoted to the frame and connected to two of the brakes, a floating lever mounted on each of the pivoted levers and connected to another brake, and independently-operable connections from the pedal and the emergency lever to the two floating levers.

2. A vehicle having front and rear pairs of brakes and a chassis frame with a pedal and an emergency lever carried thereby, in combination with a lever pivoted adjacent each side of the frame and connected to one of the brakes, a floating lever mounted on each of the pivoted levers and each connected to another brake, and a shaft operable by the pedal and having fixed thereon a pair of arms operatively engaging the floating levers through a connection including a lost motion.

3. A vehicle having front and rear pairs of brakes and a chassis frame with a pedal and an emergency lever carried thereby, in combination with a lever pivoted adjacent the side of the frame and connected to one of the brakes, a floating lever mounted on the pivoted lever and connected to another brake, a shaft operable only by the pedal and having fixed thereon an arm operatively engaging the floating lever and a connection including a lost motion device between the emergency lever and the floating lever.

4. A vehicle having front and rear pairs of brakes and a chassis frame with a pedal and an emergency lever carried thereby, in combination with a pair of levers pivoted on the frame and connected to two of the brakes, a floating lever mounted on each of the pivoted levers and each connected to another brake, a shaft operable by the pedal and rigidly connected to the floating levers and means whereby the emergency lever may operate said floating levers through said rigid connection.

5. A vehicle having front and rear pairs of brakes and a chassis frame with a pedal and an emergency lever carried thereby, in combination with a pair of levers pivoted on the frame and connected to two of the brakes, a floating lever mounted on each of the pivoted levers and each connected to another brake, a pedal-operated shaft having rigid connections to the floating levers, and connection including a lost motion device between the emergency lever and one of said shaft connections.

In testimony whereof, I have hereunto signed my name.

ALBERT C. STARR.